March 14, 1967  G. S. BALDOCK  3,309,698
RADAR SYSTEMS
Filed Oct. 7, 1964  2 Sheets-Sheet 2
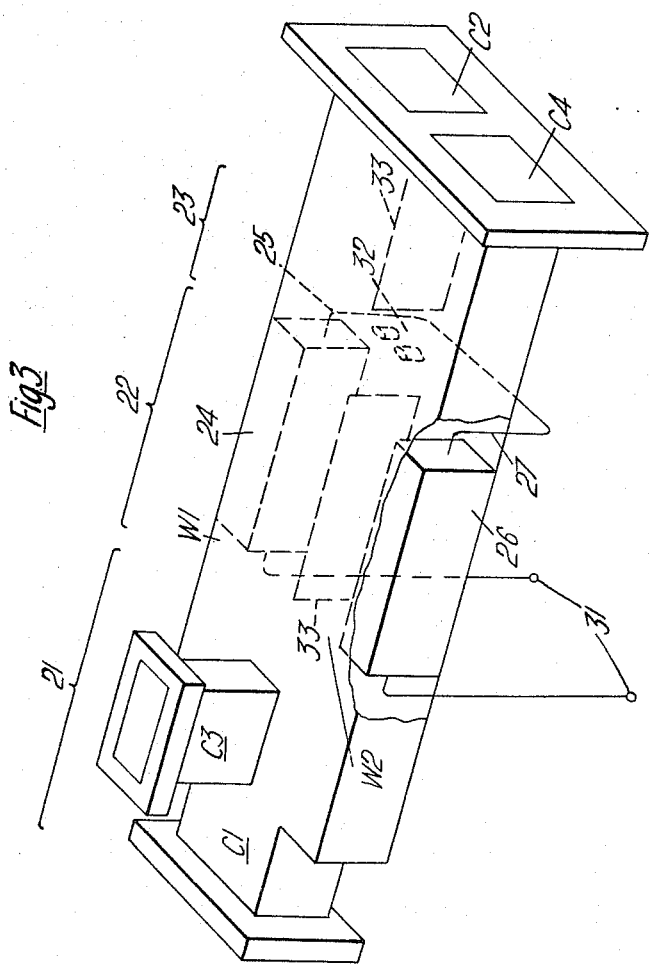
Inventor
G. S. BALDOCK
By
Cameron, Kerkam & Sutton
Attorneys

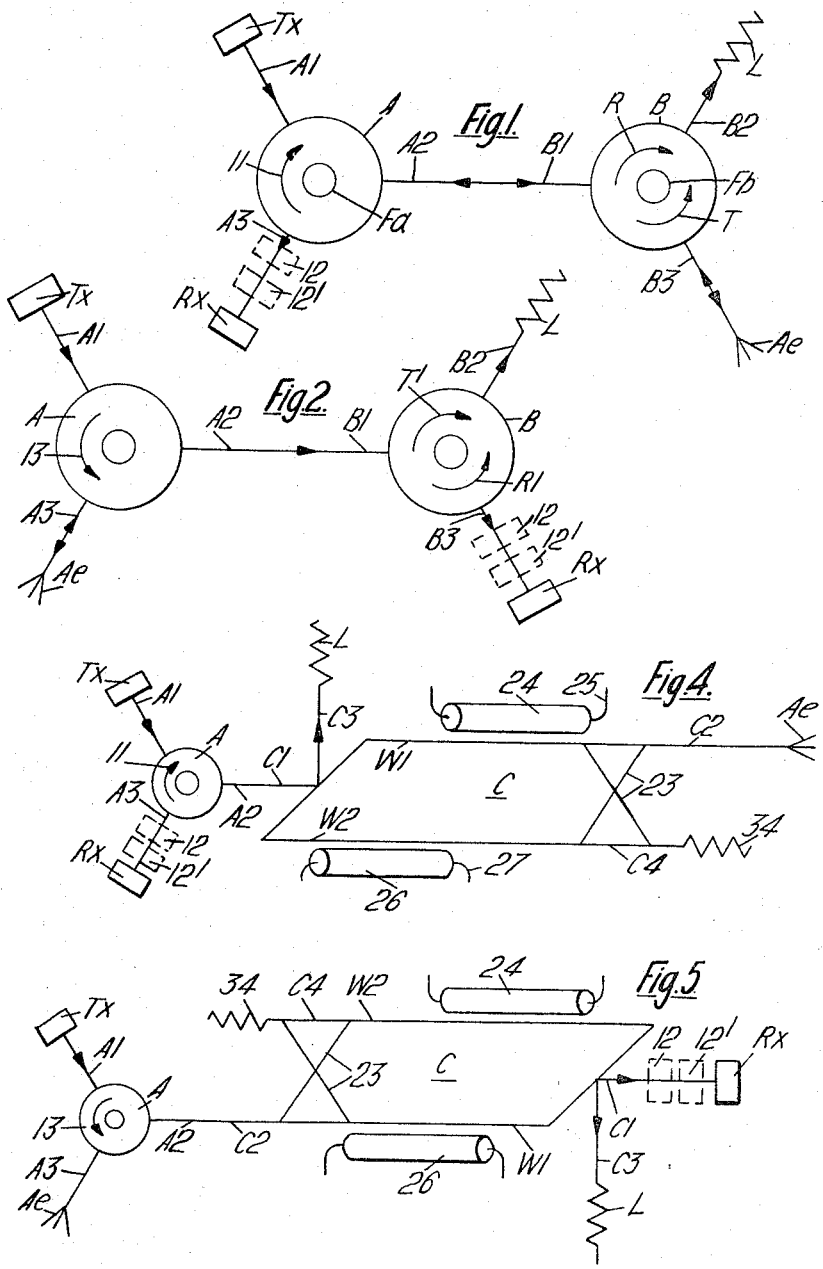

United States Patent Office 3,309,698
Patented Mar. 14, 1967

3,309,698
RADAR SYSTEMS
George Seymour Baldock, Edinburgh, Scotland, assignor to Ferranti, Limited, Lancashire, England, a company of Great Britain and Northern Ireland
Filed Oct. 7, 1964, Ser. No. 402,257
Claims priority, application Great Britain, Oct. 9, 1963, 39,734/63
8 Claims. (Cl. 343—5)

This invention relates to radar systems of the kind including waveguide duplexers to enable the transmitter and receiver to share a common aerial without subjecting the receiver to the full energy of the transmitted pulses.

Duplexers are known which rely on one or more gas-filled cells located in the waveguide channel leading to the receiver and designed to break down through ionisation of the gas when subjected to the high energy of a transmitted pulse, thereby forming a short-circuit across the guide and so protecting the receiver.

Such arrangements have the disadvantage that after the cessation of each transmitted pulse the cells require an appreciable recovery time, during which the gas de-ionises, before the short-circuit is removed from the receiver channel; this restriction limits the rate of interrogation available to the radar system.

Another disadvantage is that such a cell does not instantly respond to a transmitted pulse but allows a "spike" leakage of energy to pass through to the receiver before the cell is fully fired; and even after the gas has been fully ionised an appreciable leakage of energy still occurs to maintain the ionisation. Such leakages are harmful to the receiver unless additional protective arrangements are made.

An object of the invention is to provide a radar system of the kind set forth in which the duplexer is of a compact and efficient character.

Another object is to provide such a system which is capable of a more rapid rate of interrogation than is available to a system in which the duplexer relies solely on gas-filled cells of the kind described.

A further object is to provide such a system which affords good protection to the receiver throughout each transmitted pulse.

Another object is to provide a duplexer capable of rapid and efficient action when used in a radar system of the kind set forth, in particular where the system is of the pulse Doppler kind and therefore requiring a duplexer capable of a very high speed of operation.

In accordance with the present invention, a radar system of the kind in which the transmitter and receiver share a common aerial includes a duplexer combination of first and second interconnected waveguide multi-arm circulators the second at least of which is such that the mode of energy transfer between its arms is dependent on magnetic field polarity conditions within that circulator, an absorptive load connected to an arm of the second circulator, a connection from an arm of the first circulator to the transmitter, and connections to the receiver and to the aerial from further arms of the combination, these arms being so selected in dependence on the mode of energy transfer of the first circulator that in operation under one polarity condition of the second circulator the signals from the transmitter are directed to the aerial whereas any signals reflected by the aerial are directed to the absorptive load, and under the reverse polarity condition of the second circulator the incoming signals from the aerial are directed to the receiver, there being further provided control arrangements for causing the second circulator to be in said one field condition throughout each radar transmission and in the reverse condition for echo signal reception.

Also in accordance with the invention, there is provided for use in a radar system a duplexer combination as set forth in the preceding paragraph.

The term "circulator" should be understood to include such apparatus as a differential phase-shift circulator, described below, in which the energy transfer does not take place in a strictly rotational manner.

In the accompanying drawings,
FIGURES 1 and 2 are schematic diagrams of one embodiment of the invention,
FIGURE 3 is a drawing in perspective, with a portion shown broken away, of part of the apparatus shown schematically in FIGURE 1 but modified in accordance with another embodiment, and
FIGURES 4 and 5 show the arrangement of FIGURES 1 and 2 modified to include the apparatus of FIGURE 3.

Referring first to FIG. 1, a radar system includes a duplexer combination of first and second interconnected waveguide multi-arm ferrite circulators A and B of the known three-port or Y-junction kind the waveguide arms of which are designated A1 to A3 and B1 to B3 respectively. Arrangements are made for setting up within each circulator through the central ferrite member $F_a$ or $F_b$, as the case may be, a magnetic field normal to the plane of the arm axes, this being the plane of the paper. The mode of energy transfer between the arms of each circulator is dependent on the polarity condition of that field—that is to say, the direction of transfer round the circulator is dependent on the sense of the field. In the first circulator A it is assumed that the field is fixed in the sense to cause the mode of energy transfer to take place in the direction of the arrow 11—that is, clockwise as viewed in the drawing. Thus energy entering the circulator by way of arm A1 is directed mainly into arm A2; energy entering from arm A2 is directed mainly into arm A3; and so on. In each case there is usually a small amount of energy transfer, termed directivity leakage, in the other direction—for example, from arm A1 to arm A3.

In the second circulator B the sense of the field is reversible at will so as to cause the energy to circulate either in a counterclockwise direction or in a clockwise direction; as these directions are respectively appropriate to the transmit or to the receive condition of the radar system they are indicated by the arrows T or R as the case may be.

In circulator A, arm A1 is connected to the radar transmitter Tx, arm A2 to arm B1 of circulator B, and arm A3 to the radar receiver Rx. Of the remaining arms of circulator B, arm B2 is connected to an absorptive load L and arm B3 to the common aerial Ae. Control arrangements (not shown) are provided for setting up the field of circulator B in the sense appropriate to energy circulation in the direction T just prior to the generation by the transmitter of a radar pulse and to reverse the sense of the field immediately on the cessation of that pulse.

In operation, on the generation of a pulse by the transmitter, the energy arriving at circulator A over arm A1 is directed round the circulator in the direction of the arrow 11 to leave by arm A2. Arriving at circulator B over arm B1, the pulse finds this circulator preset for energy transfer in the T direction, and accordingly is directed round in that direction to leave over arm B3 for the aerial. Any reflections from the aerial system, such as from a radome, and any interference or other unwanted signals picked up by the aerial during transmission, on arrival back at circulator B over arm B3 are directed round in direction T to arm B2 where they are absorbed by load L.

To protect the receiver from directivity leakage in circulator A, it may be advisable to insert in the waveguide channel from arm A3 to the receiver a diode switch or like fast-operating device as indicated by the broken lines 12; such a device would also protect the receiver from any reflections there may be from load L due to incomplete absorption. As the combined leakage energy which reaches arm A3 would normally be slight, the provision of device 12 would admit of little difficulty. Thus the receiver is protected from all but a negligible proportion of the transmitted energy throughout the duration of each transmitted pulse.

Diode switch 12 is only intended to prevent leakage power from the transmitter, or reflected by the aerial, or signals received by it, from reaching the receiver whilst the radar is in its transmitting condition. Should there be any danger that during the reception periods the aerial should become illuminated at all strongly by another radar or other station near by, switch 12 might well be unable to prevent pulses from reaching the receiver of sufficient power to damage it. Such protection, however, could be fully provided by means of a TR cell $12^1$ in arm A3 between switch 12 and the receiver.

Cell $12^1$ would not fire during the transmission periods because the energy which would reach it would only be small, and even that would be much attenuated by the diode switch 12. Nor would the cell fire in response to normal signals during the reception periods. It would, however, fire and so protect the receiver in response to a damagingly strong interfering signal; but the number of occasions on which that would be likely to happen would be too small for the disadvantage of the slow recovery time to be experienced appreciably.

Immediately at the end of the transmission, the field in circulator B is reversed, thereby reversing the direction of energy transfer from T to R. Echo signals picked up by the aerial are now passed direct from arm B3 to arm B1 and thence from arm A2 of circulator A to arm A3 and the receiver. Thus there is negligible attenuation of the received signals by the duplexer.

The arrangement of FIG. 1 may be modified as shown in FIG. 2 by reversing the sense of the field in circulator A to cause the mode of energy transfer to be in the direction 13, changing over the aerial and receiver connections from arms B3 and A3 to A3 and B3 respectively, and arranging for the controlling signal to set circulator B for energy transfer in the direction $T^1$ for transmission and $R^1$ for reception, these being the opposite of the directions T and R of FIG. 1.

With this arrangement, transmitted pulses pass direct to the aerial by way of arms A1 and A3 of circulator A, leaving circulator B to receive only the directivity leakage of circulator A together with the reflections and other unwanted signals from the aerial; these are passed to arm B2 and hence to the absorptive load L. During reception, the echo signals from the aerial reach the receiver by way of arms A3, A2, B1, and B3.

The arrangement of FIG. 2 could alternatively be derived by leaving the energy transfer directions as in FIG. 1 and modifying instead the various connections to the circulators. Thus the transmitter would be connected to arm A3, the aerial to arm A1, the load L to arm B3, and the receiver to arm B2. It will be appreciated that the difference between this modification and the arrangement of FIG. 2 is solely one of the designations of the respective arms; electrically the two arrangements are identical.

In practice, it may not be precticable to provide a way of reversing the field of a three-arm or Y type circulator as quickly as is required. As the field of such a circulator has to be parallel to the axis of energy circulation, a coil would be needed to generate it, and the inductance of a coil with the smallest number of turns necessary to provide the field might cause the reversal of current to be too much retarded. The field set up by a straight conductor could be reversed quickly enough, but such a conductor could not be used to generate the field required by this kind of circulator.

In practice, therefore, the arrangement of either FIG. 1 or FIG. 2 is usually modified in so far that second circulator B is replaced by a circulator which is of such a kind that the field may be generated by a straight conductor.

A typical circulator of that kind, sometimes referred to as a differential phase-shift circulator, will now be described with reference to FIG. 3.

The construction includes a waveguide folded-T junction, indicated generally at 21. The junction has conjugate waveguide arms C1 and C3 and folded side waveguides W1 and W2 which lead by way of phase-shift stage 22 and a Riblett hybrid coupler 23, common to both guides, to further waveguide arms C2 and C4.

In this arrangement the field polarity conditions within the circulator are set up in phase-shift stage 22. For this purpose guide W1 contains a longitudinal ferrite member 24 carrying internally a straight conductor 25, and guide W2 similarly contains a ferrite member 26 and internal conductor 27. Each of these members may conveniently take the form of a stack of ferrite rings, such as are used for computer memory cores, threaded on and supported by the conductor. Conductors 25 and 27 are connected in series so that any current carried by them flows in opposite directions along the respective stacks of cores. Their free ends are brought out to terminals 31.

Each of the respective field conditions is set up by passing a current through the conductors by way of terminals 31 in one or other direction. In each of the two conditions, the field established by the ferrite member in one guide is transverse to the guide and of opposite sense to the field established by the ferrite member in the other guide. Reversal of the conditions, by reversing the direction of the current, reverses the sense of each field. Only a momentary pulse of direct current is required to establish a particular field condition; on the cessation of the pulse the ferrite members remain magnetised until a current pulse in the opposite direction is applied to them.

The coupler 23 is of a conventional kind, consisting of a two-stud gap 32 in the wall 33 which separates guide W1 from guide W2.

The folded-T junction functions normally: energy entering by arm C1 divides equally and in phase into guides W1 and W2, none (except perhaps some leakage) passing to arm C3; energy entering by arm C3 also divides equally into guides W1 and W2 but in counterphase; energy entering by guides W1 and W2 combines in arm C1 if in phase but in arm C3 if in counterphase.

Phase-shift stage 22, when transverse fields are set up by the ferrite members 24 and 26 by a current in the conductors, causes the energy in one of the guides W1 and W2, as determined by the respective field polarities and by the direction of energy flow, to lag 90° on that in the other guide. Coupler 23 imposes a 90° lag on energy passing through it.

The following three particular modes of energy transfer, each depending on the field polarity condition—that is, the senses of the respective fields—and hence on the direction of current pulse through the ferrite members which established that condition, may be noticed:

*Field Condition I*

Energy flowing in the direction from the folded-T junction to the coupler is caused to lag in guide W1 on the energy in guide W2.

Mode (1): energy entering at C1 divides equally into guides W1 and W2; in phase-shift stage 22 the energy in guide W1 receives a 90° lag; in coupler 23 the respective 90° lags imposed by it bring the combined energies into phase in arm C2 but into counterphase in arm C4. Hence the energy passes from C1 to C2.

Mode (2): energy entering at C2 receives a 90° lag on passing through the coupler into guide W2 and a further 90° lag from the field there (in this direction the energy in W2 lags on that in W1); at the folded-T junction, the respective energies, being in counterphase, pass into arm C3.

*Field Condition II: opposite on Condition I*

Mode (3): energy entering at C2 receives a lag from the coupler on entering guide W2, which balances the lag imposed by the field in guide W1, thereby bringing the energies into phase at the folded-T junction and so out by arm C1.

The use of such a circulator in substitution for circulator B of FIG. 1 is shown in FIG. 4, where the circulator is represented schematically at C.

Arm A2 from circulator A is connected to arm C1, the absorptive load L to arm C3, and the aerial to arm C2; arm C4 is connected to an absorptive load 34. Arrangements are made to set up fields of Condition I slightly in advance of each radar pulse from the transmitter Tx and for reversing the direction to change the fields to Condition II immediately at the end of the radar pulse. As already indicated, these fields are set up by applying direct-current pulses to terminals 31. Each pulse may be very brief—shorter, in fact, than the length of a signal pulse from the transmitter.

In operation, the arrival of a radar pulse over arm C1 at circulator C finds it in Condition I. Hence the energy passes in mode (1) of transfer into arm C2 and so to the aerial. Any reflections or unwanted signals from the aerial during a transmission and entering the circulator by arm C2 pass in mode (2) of transfer through arm C3 to the absorptive load L. Any reflections from load L due to incomplete absorption pass in a further mode to arm C4; here they are absorbed by load 34, which also absorbs any leakage energy passed into arm C4 from the coupler 23.

A received echo signal finds the circulator in Condition II and so the energy entering from the aerial over arm C2 passes to arm C1, in mode (3), thence to the receiver by way of arms A2 and A3.

Where TR cell 12$^1$, or like passive protection against interference, is not provided, the system should be switched to the "transmit" condition when the station is closed down, in order to protect the crystal detector of the receiver from accidental damage from such a signal. Under these conditions the signal would be directed to the dissipative load.

The system of FIG. 4 may be modified to give three other systems by a cyclic re-arrangement of the connections. Thus advancing two steps in the cycle, arm A2 may be transferred from arm C1 to arm C3, load L from C3 to C1, and the aerial from C2 to C4, C2 now being the arm which is not used except perhaps to absorb leakage energy. This arrangement is electrically equivalent to that illustrated.

As the folded-T junction gives better isolation than the Riblett coupler it is preferable to include the dissipative load L in either of arms C1 or C3—as in the arrangement of FIG. 4 or the particular modification of its described in the preceding paragraph—rather than in either of arms C2 or C4, as is practicable in other cyclic re-arrangements.

The substitution of circulator C for circulator B in the arrangement of FIG. 2 is shown at FIG. 5. Arm A2 is here connected to arm C2, the receiver Rx to arm C1, and the absorptive load L to arm C3; arm C4, as before, is used only for load 34.

In operation, reflections and unwanted signals received by arm C2 from the aerial during a transmission are passed to arm C3 in mode (2) of transfer and hence to load L; whereas echo signals received by arm C2 from the aerial during reception are passed to arm C1 and so to the receiver Rx in mode (3). Any reflections from load L due to incomplete absorption of the aerial reflections during a transmission pass into arm C4 to be absorbed by load 34 as before.

The arrangement of FIG. 5 could also be modified by cyclically changing the connections. Here also the preferred arrangements are those in which the dissipative load is in arm C1 or arm C3.

A radar system in accordance with the invention thus allows interrogation at a higher rate than that practicable with systems relying on gas-filled duplexers, and has the further advantages of giving efficient protection to the receiver during transmissions and of allowing reduction in bulk because of the simple and compact nature of the duplexer employed.

What I claim is:

1. A radar system of the kind having a transmitter, a receiver and a common aerial adapted to be used by both the transmitter and the receiver, said system including a duplexer combination of first and second interconnected waveguide multi-arm circulators, means for setting up within at least the second circulator a magnetic field the polarity condition of which controls the mode of energy transfer between the arms of said circulator, an absorptive load connected to one arm of the second circulator, a connection from one arm of the first circulator to the transmitter, a connection from a second arm of one of said circulators to the receiver and a connection from a second arm of the other of said circulators to the aerial, said second arms being so selected in dependence on the mode of energy transfer of the first circulator that, when the magnetic field set up in the second circulator produces one polarity condition, the signals from the transmitter are directed to the second arm connected to the aerial while signals reflected by the aerial are directed to the absorptive load connected to said one arm of the second circulator, and when the polarity condition of the second circulator is reversed, the incoming signals from the aerial are directed to the second arm connected to the receiver, and means for causing the magnetic field in the second circulator to produce said one polarity condition throughout each transmission of a signal from the transmitter to the aerial and the reverse polarity condition in time for resulting echo signal reception.

2. A radar system as claimed in claim 1, wherein the aerial is connected to a second arm of the second circulator and the receiver is connected to a second arm of the first circulator.

3. A radar system as claimed in claim 1 wherein the aerial is connected to a second arm of the first circulator, and the receiver is connected to a second arm of the second circulator.

4. A radar system as claimed in claim 1 wherein the second circulator comprises a folded-T junction having conjugate waveguide arms and folded side waveguide arms having in common a hybrid coupler, said absorptive load being connected to one of said conjugate arms, and the means for setting up said magnetic field polarity conditions are associated with the folded side arms of the junction, and including a further absorptive load connected to one of said folded side arms.

5. For use in a radar system, a duplexer combination of first and second waveguide multi-arm circulators each having one arm connected to one arm of the other for the transmission of electrical signals therebetween, means for setting up within at least the second circulator a magnetic field the polarity condition of which controls the mode of energy transfer between the arms of said circulator, an absorptive load connected to another arm of the second circulator, and control means for reversing the magnetic field polarity conditions within the second circulator at will.

6. A radar system of the kind having a transmitter, a receiver and a common aerial adapted to be used by both the transmitter and the receiver, said system including a duplexer combination of first and second interconnected waveguide multi-arm circulators, means for setting up within at least the second circulator a magnetic field the polarity condition of which controls the mode of energy transfer between the arms of said circulator, an absorptive load connected to one arm of the second circulator, a connection from one arm of the first circulator to the transmitter, a connection from a second arm of one of said circulators to the receiver and a connection from a second arm of the other of said circulators to the aerial, said second arms being so selected in dependence on the mode of energy transfer of the first circulator that, when the magnetic field set up in the second circulator produces one polarity condition, the signals from the transmitter are directed to the second arm connected to the aerial while signals reflected by the aerial are directed to the absorptive load connected to said one arm of the second circulator, and when the polarity condition of the second circulator is reversed, the incoming signals from the aerial are directed to the second arm connected to the receiver, and means for reversing the magnetic field polarity conditions within the second circulator at will.

7. A radar system as claimed in claim 6 wherein said second circulator comprises a folded-T junction having conjugate waveguide arms and folded side waveguide arms having in common a hybrid coupler, said absorptive load being connected to one of said conjugate arms, the other of said conjugate arms being connected to a third arm of said first circulator, said means for reversing the magnetic field polarity conditions within the second circulator at will being associated with the folded side arms of the junction, and including a further absorptive load connected to one of said folded side arms, the aerial being connected to the other folded side arm and the receiver being connected to the said second arm of the first circulator.

8. A radar system as claimed in claim 6 wherein said second circulator, said means for reversing the magnetic conjugate waveguide arms and folded side waveguide arms having in common a hybrid coupler, said absorptive load being connected to one of said conjugate arms, the other of said conjugate arms being connected to said receiver, a further absorptive load connected to one of said folded side arms, said circulators being interconnected by a third arm of the first circulator and the other folded arm of the second circulator, said means for reversing the magnetic field polarity conditions within the second circulator at will being associated with the folded side arms of the junction, and the aerial being connected to the said second arm of the first circulator.

No references cited.

CHESTER L. JUSTUS, *Primary Examiner.*
RODNEY D. BENNETT, *Examiner.*